US012278737B2

(12) United States Patent
Goloubev et al.

(10) Patent No.: US 12,278,737 B2
(45) Date of Patent: Apr. 15, 2025

(54) DISTRIBUTED VIRTUALIZATION OF TELEMETRY PROCESSING WITH IP ANYCAST

(71) Applicant: Cisco Technology, Inc., San Jose, CA (US)

(72) Inventors: Dmitri Goloubev, Waterloo (BE); Peter De Vriendt, Denderleeuw (BE); Donald M. Allen, Colorado Springs, CO (US); Luc De Ghein, Deinze (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/978,259

(22) Filed: Nov. 1, 2022

(65) Prior Publication Data

US 2024/0146614 A1 May 2, 2024

(51) Int. Cl.
*H04L 41/14* (2022.01)
*H04L 43/062* (2022.01)
*H04L 61/5069* (2022.01)

(52) U.S. Cl.
CPC .......... *H04L 41/14* (2013.01); *H04L 43/062* (2013.01); *H04L 61/5069* (2022.05)

(58) Field of Classification Search
CPC ... H04L 41/14; H04L 43/062; H04L 61/5069; H04L 43/08; H04L 43/06; H04L 43/04; H04L 43/20; H04L 41/40; H04L 67/10; H04L 47/125; H04L 12/44; G06F 15/173; G06F 9/5072; G06F 2209/5015; G06F 2209/503; G06F 2212/1041
See application file for complete search history.

(56) References Cited

U.S. PATENT DOCUMENTS 9,160,667 B2 * 10/2015 Satterlee ............ H04L 41/0668
9,456,049 B2 * 9/2016 Soundararajan ........ H04L 67/06
(Continued)

FOREIGN PATENT DOCUMENTS

WO 2021014419 A1 1/2021

OTHER PUBLICATIONS

Kuhn, F. et al., "Distributed Computation in Dynamic Networks." Proceedings of the 42nd ACM Symposium on Theory of Computing—STOC '10, http://dx.doi.org/10.1145/1806689.1806760, Jun. 5, 2010, 11 pages.

(Continued)

*Primary Examiner* — Alex H. Tran
(74) *Attorney, Agent, or Firm* — Edell, Shapiro & Finnan, LLC (57) ABSTRACT

Presented herein are techniques to analyze network traffic and equipment based on telemetry generated by a plurality of network devices. A method includes generating first telemetry at a first network device, receiving, at the first network device, via an Internet Protocol anycast addressing scheme, at least one of second telemetry generated at a second network device, and third telemetry generated at a third network device, performing, on the first network device using a local processing unit, first analytics on the first telemetry, performing, on the first network device using the local processing unit, second analytics on the at least one of the second telemetry and the third telemetry, and transmitting data resulting from the first analytics and the second analytics to a fourth network device.

20 Claims, 5 Drawing Sheets

(56) References Cited

U.S. PATENT DOCUMENTS

| | | | | |
|---|---|---|---|---|
| 9,590,880 | B2* | 3/2017 | Ashby | H04Q 9/00 |
| 10,540,358 | B2* | 1/2020 | Wu | G06F 16/24578 |
| 10,546,022 | B2* | 1/2020 | Raghavendra | H04L 41/14 |
| 10,992,536 | B2* | 4/2021 | Karasaridis | H04L 67/10 |
| 10,992,556 | B2* | 4/2021 | Guim Bernat | H04L 43/08 |
| 11,451,450 | B2* | 9/2022 | Patki | H04L 41/14 |
| 11,475,007 | B2* | 10/2022 | Mittal | G06F 9/44505 |
| 11,567,998 | B2* | 1/2023 | Armbrust | G06F 16/245 |
| 11,595,274 | B1* | 2/2023 | Nagaraju | G06N 20/00 |
| 11,609,554 | B2* | 3/2023 | Burnham | G05B 23/0221 |
| 11,665,094 | B2* | 5/2023 | Deshmukh | H04L 45/745 |
| | | | | 370/392 |
| 11,689,436 | B2* | 6/2023 | Nachimuthu | H04Q 11/0003 |
| | | | | 709/205 |
| 11,870,683 | B2* | 1/2024 | Eadala | H04L 45/24 |
| 2017/0099346 | A1 | 4/2017 | Eisenbud et al. | |
| 2017/0302552 | A1 | 10/2017 | Ward et al. | |
| 2018/0048525 | A1 | 2/2018 | Karasaridis et al. | |
| 2020/0177509 | A1* | 6/2020 | Itach | H04L 45/563 |
| 2021/0320854 | A1* | 10/2021 | King, V | H04L 43/0817 |

OTHER PUBLICATIONS

"Apache Storm," Apache Storm, retrieved from https://storm.apache.org/ on Aug. 1, 2023, 4 pages.

"Unified engine for large-scale data analytics," Apache Spark, retrieved from https://spark.apache.org/ on Aug. 1, 2023, 9 pages.

"Apache Nifi," The Apache Software Foundation, retrieved from https://nifi.apache.org/ on Aug. 1, 2023, 2 pages.

* cited by examiner

DISTRIBUTED VIRTUALIZATION OF TELEMETRY PROCESSING WITH IP ANYCAST

TECHNICAL FIELD

The present disclosure relates to network traffic and equipment analysis based on received telemetry.

BACKGROUND

The advent and adoption of structured telemetry data has enhanced the depth and granularity of network observability and analytics. Structured telemetry has also simplified somewhat the development of analytics since structured data reduces the need to scrub data and simplifies the parsing of data.

Analyzing data beyond the device-level (for example at a point of presence (PoP), Pod, Access, or Distribution or Core block) requires a significant amount of data pre-processing and aggregation. Unfortunately, the complexity of these manipulations has resulted in industry only sparingly adopting telemetry to broadly manage higher level capabilities and services.

Another potential industry hurdle to adopting the enhanced use of telemetry is that, while streaming telemetry supports the ability to extract data from a device, doing so continuously leads to significant compute requirements to process the collected data.

Still other challenges regarding increased use of telemetry for network and equipment analysis are legal regulations and privacy concerns due to data compliance considerations, which further add to the complexity and management of data consumption.

DETAILED DESCRIPTION

Overview

Presented herein are techniques to analyze network traffic and equipment based on telemetry generated by a plurality of network devices. A method includes generating first telemetry at a first network device, receiving, at the first network device, via an Internet Protocol anycast addressing scheme, at least one of second telemetry generated at a second network device, and third telemetry generated at a third network device, performing, on the first network device using a local processing unit, first analytics on the first telemetry, performing, on the first network device using the local processing unit, second analytics on the at least one of the second telemetry and the third telemetry, and transmitting data resulting from the first analytics and the second analytics to a fourth network device.

In another embodiment, an apparatus is provided. The apparatus may include a network interface unit configured to enable network communications, a memory configured to store logic instructions, and a processor, when executing the logic instructions, configured to: generate first telemetry, receive via an Internet Protocol anycast addressing scheme, at least one of second telemetry generated at a first network device, and third telemetry generated at a second network device, perform, using a local processing unit on the apparatus, first analytics on the first telemetry, perform, using the local processing unit on the apparatus, second analytics on the at least one of the second telemetry and the third telemetry, and transmit data resulting from the first analytics and the second analytics to a third network device.

EXAMPLE EMBODIMENTS

A system and methodology are described herein to enable wider adoption of structured telemetry in the context of network monitoring and analysis. Many modern network devices, beyond the most basic models, have sufficient spare compute and data storage capacity, at least temporarily, to process data (i.e., telemetry, such as counters, timers, indicators, flags, etc.) they, and perhaps other, neighboring, network devices, generate. The embodiments described herein take advantage of this spare compute and data storage capacity by using the spare compute and data storage capacity to process local telemetry data, as well as telemetry data generated by neighbor network devices. More specifically, the embodiments described herein enable the use of transiently-available resources (compute, storage, etc.) for distributed computation and analytics execution that is more economical and scalable, simpler in implementation, and allows for telemetry data movement in accordance with legal requirements or privacy choices of the data owner.

In brief, and as will be explained in more detail below, network virtual telemetry processing (NVTP) logic using, e.g., a constraint-driven machine learning-assisted computation optimizer, among other components, maps parts of a computational graph to available local processing units (LPUs) of selected network devices to maximize data processing close to the source of data generation. In one implementation, NVTP logic may also use a pool of Internet Protocol (IP) anycast addresses to route data from telemetry sources (neighbor network devices) to a nearest LPU, or, absent a sufficiently close LPU, to, e.g., a controller that hosts NVTP logic. Protocols such as Google's Remote Procedure Call (gRPC) Network Management Interface (gNMI), or functionally similar protocols, may be used to dynamically subscribe data at the network device level and direct data to an appropriate LPU on a neighbor network device. That is, a subscription destination may be an IP anycast address from a pool of such addresses.

The embodiments are unique in that they employ IP anycast to deliver telemetry to available (and potentially changing) local processing units and provide mechanisms for managing local overloads. The embodiments furnish relevant slices, or portions, of a computational graph-based analytics representation to LPUs using a communication/synchronization mechanism. The embodiments also provide automated closed-loop telemetry subscription management. In one implementation, NVTP logic is configured to manage IP anycast addresses and telemetry subscriptions to optimize the use of transiently-available resources. Further, the embodiments enable optimization of resources. For example, LPUs may be configured to react to local LPU overload conditions in the short-term, but the computational optimizer executed by NVTP logic may be configured to move payloads to improve load distribution (perhaps taking into account, e.g., execution latency, execution jitter, propensity for distribution, etc.).

Figure 1:
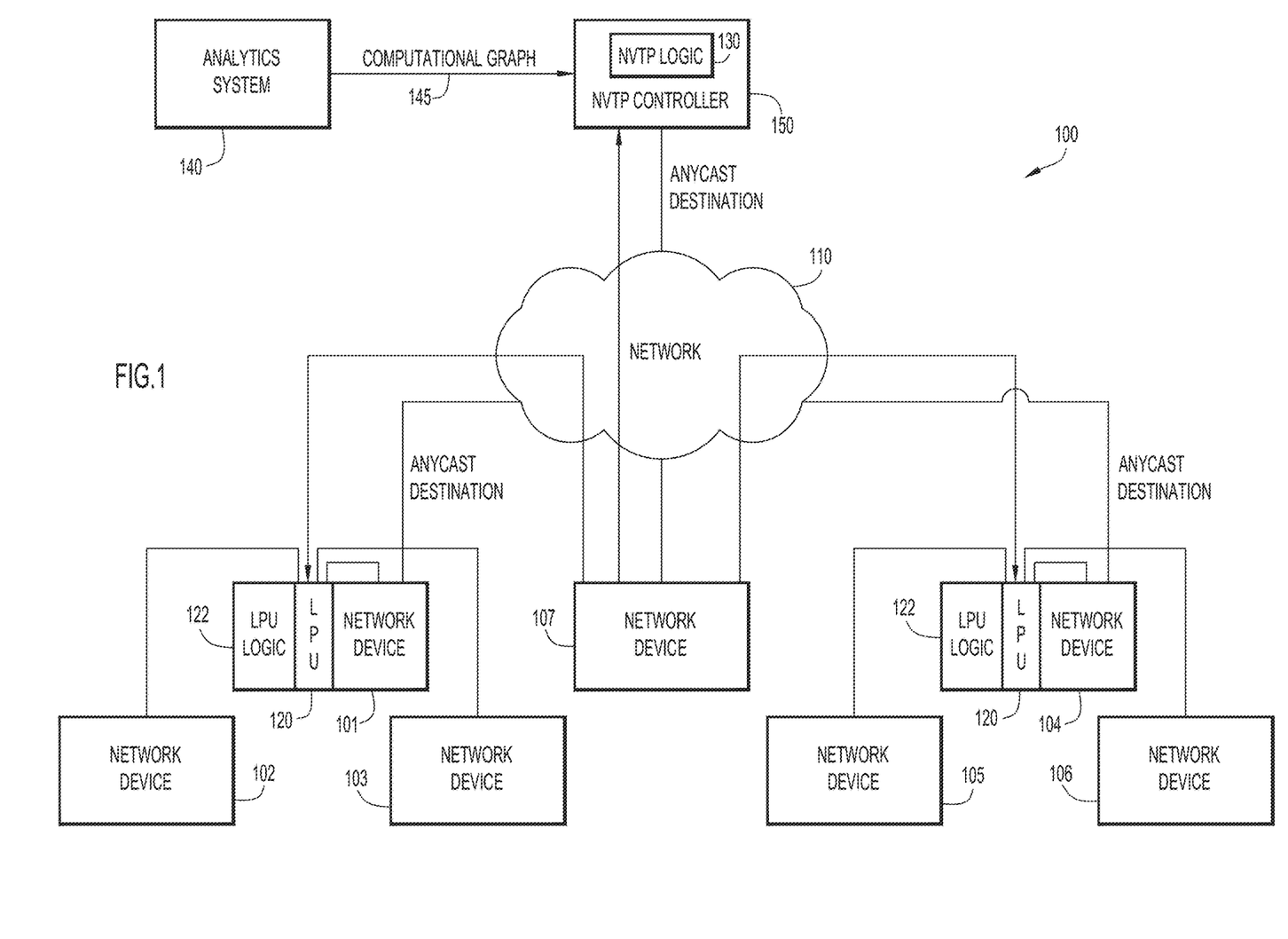
FIG. 1 shows a network topology including a controller, which hosts network virtual telemetry processing logic, and individual network devices some of which include local processing units (LPUs) and LPU logic for processing telemetry, in accordance with an example embodiment.

Reference is now made to the figures, beginning with FIG. 1, which shows a network topology 100 including a controller 150, which hosts network virtual telemetry processing (NVTP) logic 130, and individual network devices some of which include a local processing unit (LPU) 120 and LPU logic 122 configured to process locally generated and neighbor-generated telemetry, in accordance with an example embodiment. More specifically, a network 110, such as the Internet or a private network, interconnects multiple devices including network devices 101, 102, 103, 104, 105, 106, and 107. These networks devices may be one of many types of devices including, e.g., routers, switches, firewalls, etc. While each network device 101, 102, 103, 104, 105, 106, and 107 includes, e.g., compute and storage capabilities to perform its own native functions, at least network device 101 and network device 104 also are configured with a local processing unit (LPU) 120 and associated LPU logic 122 that is comprised of the native compute and storage functionality to perform non-telemetry data processing, but is made available, on at least a transient basis, to process telemetry generated by network device 101 and network device 104, themselves, as well as, potentially, neighbor network devices 102, 103, 105, 106, and 107, which are not designated to perform LPU 120 functionality. That is, each LPU 120 may be implemented as a thin software agent (in the form of LPU logic 122) that runs on selected network devices and may have sufficient compute/storage capabilities to process telemetry data, at least from time to time.

As further shown in FIG. 1, an Analytics System 140, which may host any number of types of analytics, is configured to generate a computational graph of, e.g., a subset of the analytics, that is then supplied to an LPU 120 in advance, or in response to a request from an LPU 120. That is, analytics elements are built as computational graphs combining data element specifications with topology-aware source specifications with processing operations specifications. One example of a computational graph is described in connection with FIG. 2. Another example of a computational graph might be configured for analysis of CPU utilization. In this other example, CPU utilization data may be collected from network devices (e.g., routers) every ten seconds and the average and standard deviation of that data is calculated for ten-minute-long windows (which may be configured to overlap by some smaller period with subsequent ten-minute-long windows). An average of the data sets may be taken.

Finally, controller 150, which hosts NVTP logic 130, has visibility into network 110 and the network devices connected thereto including each of network device 101, 102, 103, 104, 105, 106, and 107. As will be explained in more detail below, NVTP logic 130 may include several components or functionalities.

A goal of the overall system described herein is to maximize the use of existing resources in network 110 to perform as much computation as possible near the sources of generated telemetry data. Since telemetry data is generally changing faster than processing logic, the described embodiments optimally move processing logic to data sources, rather than the data to the location of logic execution. To optimally distribute computation, the present embodiments deploy analytics to individual LPUs 120 as a computational graph 145 (e.g., a directed acyclic graph (DAG)). Loops are possible inside each operation (node of a DAG), but externally computational graph 145 is acyclic and directed.

Figure 2:
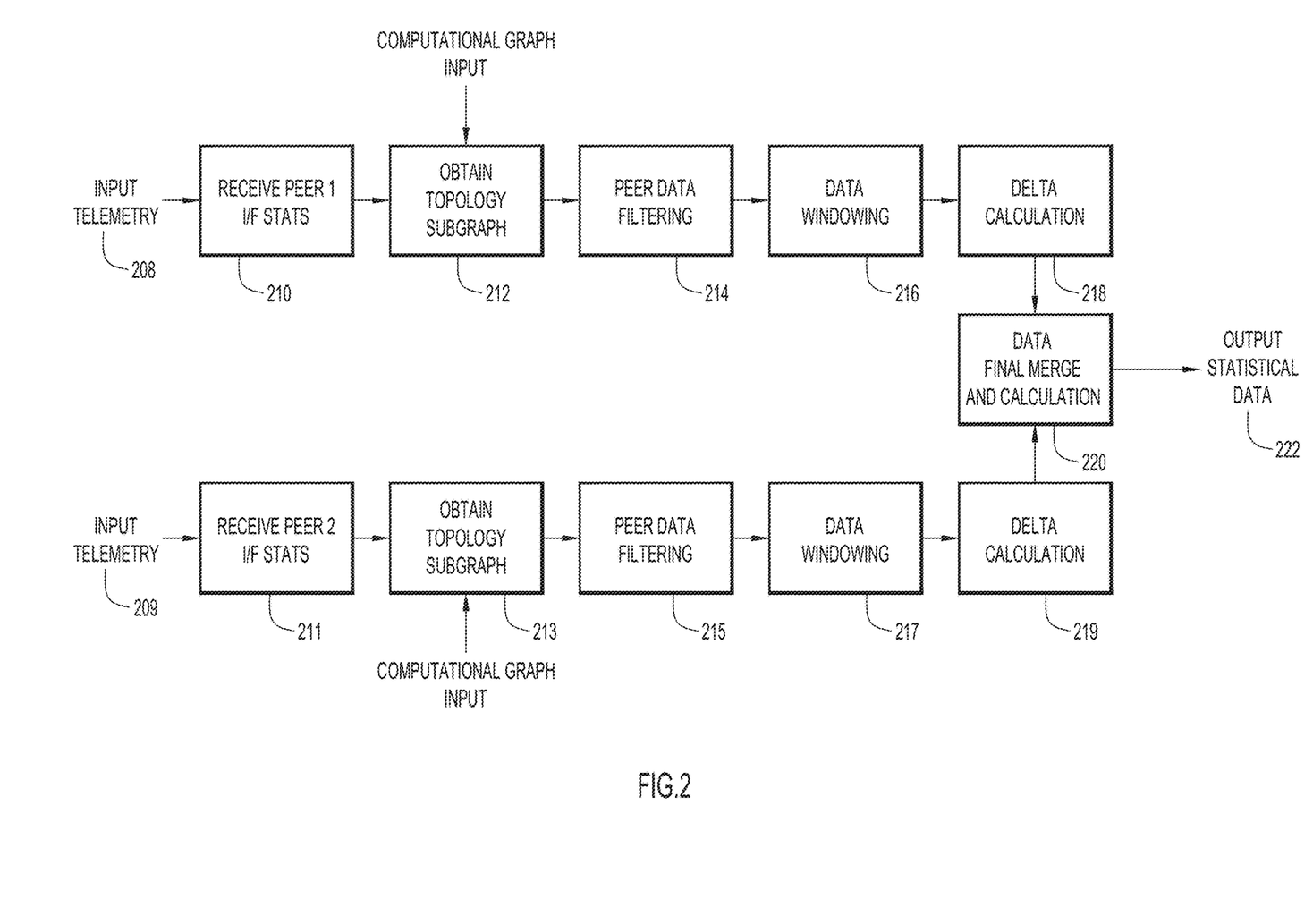
FIG. 2 shows a flow diagram of operations performed by an LPU and/or LPU logic of an individual network device that processes telemetry, in accordance with an example embodiment.

FIG. 2 shows a flow diagram of operations performed by an LPU 120 and/or LPU logic 122 of an individual network device that processes telemetry, in accordance with an example embodiment. Those skilled in the art will appreciate, however, that the parallel flows shown in FIG. 2 could also be performed by two different LPUs 120 and/or LPU logic 122. In this case, the LPU 120 and/or LPU logic 122 is operating on two telemetry streams 208, 209 generated itself and/or, received from neighbor network devices, e.g., network device 102 and network device 103. The following description mentions operations of LPU 120, but those skilled in the art will appreciate that LPU logic 122 may perform all or portions of the described operations.

More specifically, at 210, 211, LPU 120 receives interface (I/F) statistics (i.e., telemetry) from respective peer network devices 102, 103 (a peer device in this context could also be the network device itself which hosts a given instance of LPU 120 that is acting on the telemetry). At 212, 213 LPU 120 obtains an appropriate computational graph 145 from, e.g., NVTP logic 130 executing on controller 150, or even directly from Analytics System 140. At 214, 215 the peer data (telemetry) is filtered in accordance with the computational graph 145. At 216, 217, LPU 120 performs data windowing on the resulting filtered data. At 218, 219, LPU 120 performs delta calculations (e.g., identifies anomalies in the filtered and windowed data), and at 220, LPU 120 performs a data final merge and calculation operation, which aggregates the results of the delta calculations. LPU 120 then outputs statistics/data 222 resulting from operation 220, and transmits statistics/data 222 to, e.g., NVTP logic 130. NVTP logic 130, in turn, can aggregate such results from multiple LPUs 120 that are performing similar processing for other network devices. The processed data, aggregated, or in its original form, may also be forwarded to Analytics System 140.

Figure 3:
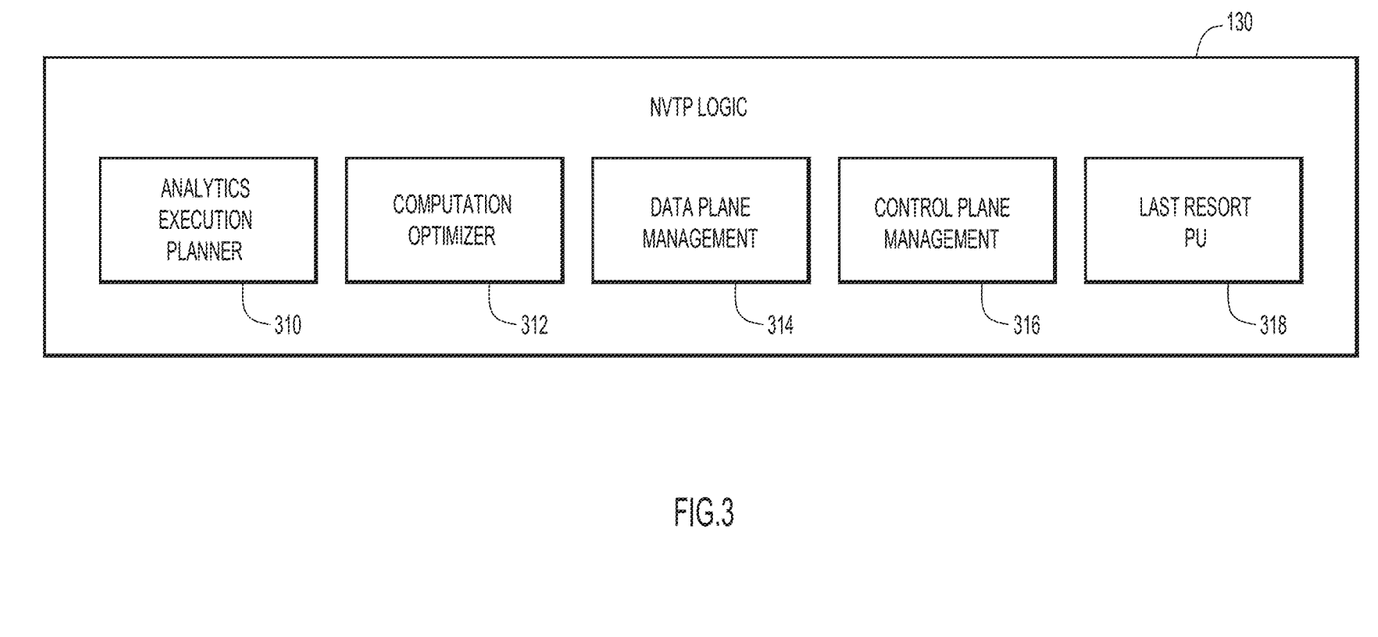
FIG. 3 shows functional components of network virtual telemetry processing logic, in accordance with an example embodiment.

FIG. 3 shows functional components of NVTP logic 130, in accordance with an example embodiment. As shown in the figure, NVTP logic 130 may include an Analytics Execution Planner 310, a Computation Optimizer 312, a Data Plane management function 314, a Control Plane management function 316, and a Last Resort Processing Unit (LRPU) 318. These components are described below, with the description of Computation Optimizer 312 last.

Analytics Execution Planner 310 is configured to analyze the configuration, topology, and appropriate set of analytics, and determines which analytics can be executed at which LPU 120. That is, Analytics Execution Planner 310 resolves a mapping of which analytics rely on which data from which network device.

Data Plane management function 314 is configured to create and manage telemetry subscriptions to particular data (as specified in the nodes of a given computational graph 145). Data Plane management function 314 may receive processing reports from LPUs 120 and, in turn, feed recommendations to Computation Optimizer 312 for improvement of resource utilization (to, e.g., even the load among LPUs 120, minimize hops of data from respective network devices, minimize analytics execution time, or other criteria as per configuration).

In an embodiment, telemetry subscriptions are managed via protocols like gNMI or similar protocols, as well as by directly manipulating network device configuration. And, in a particular implementation, the destination address of a given subscription (i.e., telemetry stream) is an IP anycast address.

In parallel to creating subscriptions, Control Plane management function 316 is configured to instruct active LPUs 120 to route data to a given IP anycast address via either direct participation in routing or via connected network redistribution and virtual interface state manipulation.

Last Resort Processing Unit (LRPU) 318 may be configured to inject a route for the specified IP anycast address. That is, if the local processing capacity of an LPU 120 is too distant or none of LPUs 120 are available (in a given region/area) LRPU 318 may be configured to receive telemetry data from a subset of network devices/sources and may thereafter perform computations for that subset in accordance with the appropriate computational graph 145. In one possible implementation, it is possible to use Cloud elastic scaling for processing 'spillover' traffic if no local processing capacity is available.

Statistics/data 222 collected by NVTP logic 130 is then processed by NVTP logic 130 itself to detect telemetry loss due, e.g., to load conditions, connectivity issues, bugs or other causes. This affords the system the option to remediate by moving or reprogramming failing subscriptions.

Analytics Optimizer 312 is configured to provide several functions. For example, Analytics Optimizer 312 is configured to move the telemetry load around to different LPUs 120 by splitting some device subscriptions to several IP anycast addresses (affinity groups). For example, a first subset of sources may send telemetry to IP anycast address A and a second subset of sources may send telemetry to IP anycast address B, depending on the load data received from LPUs. In accordance with one implementation, Analytics Optimizer 312 is configured to cause telemetry to generally flow to a closest LPU 120, and depending on LPU availability, composition of data operated on by analytics, and execution patterns, may result in the load between LPUs 120 being uneven. Analytics Optimizer 312 may be configured to address such conditions in the mid-term, while, in the short-term, LPUs 120 may be configured to make local decisions autonomously.

Additionally, Computation Optimizer 312 may be configured to pursue optional configurational goals (per analytics element or globally). Such goals may include minimizing mean hops that data travels for analytics execution at LPUs, minimizing analytics execution time, among other possible optimizations. Computation Optimizer 312 may be implemented using explicit logic, and/or with machine learning, which may allow the use of a significant amount of context without complicating the implementation. One possible implementation may use reinforcement learning (RL), which would permit multi-criteria optimization with awareness of time and other context.

Computation Optimizer 312 may operate based on input statistics from LPUs 120 (received via, e.g., Control Plane management function 316) and may include average load, peak load, analytics execution counts, analytics execution metadata (time taken, hops, sources seen, other LPUs seen, etc.).

As noted, each LPU 120 may be a thin software agent (e.g., LPU logic 122) that runs on a subset of network devices (but could optionally operate on dedicated resources for compliance, archiving, or other purposes). At certain times (per configuration or other means) a given LPU 120 may be available for computation. LPU 120 may communicate such availability with system controller via Control Plane management function 316.

In an implementation an LPU 120 does not decide or control what data it will receive from what source. Such a determination is dependent on what analytics are running and what devices are close, topologically, from a routing point of view. This means that a given LPU 120 may need to retrieve computational graph 145 or subgraph of computational graph 145 after the data (telemetry) has arrived at LPU 120. This may be accomplished using Control Plane management function 316 by using received telemetry data context (for example YANG path, SNMP OID, command name for command line interface (CLI), etc.). LPU 120 may choose to cache received logic (i.e., computational graph 145) in the event computational graph 145 is going to be used again, which could be highly likely in the context of streaming telemetry. That is, computational graph 145 may be persisted on the network device to process telemetry that is to be received at a later time. Cache invalidation criteria (used to confirm validity of a given computational graph 145 or segment thereof) can be performed by LPU 120 based on data periodicity configuration settings from an Analytics System 140.

If the data needed for particular analysis ends up on different LPUs 120, additional synchronization mechanisms, execution instance, and context tracking may be employed such that the analytics running on different data on different LPUs 120 can be matched accurately. This synchronization may be achieved via communication with Control Plane management function 316 as well as via provisions in computational graph 145 to merge intermediate computation results from different execution streams.

Control Plane management function 316 communication may also be used to periodically update the NVTP logic 130, and particularly Computation Optimizer 312, with statistical data upon which Computation Optimizer 312 can base reallocation of resources of the LPUs 120.

In an embodiment, a given LPU 120 may inject a route to a given anycast address via direct participation in routing or via virtual interface control (with redistribution of the attached route).

Finally, LPU 120 is configured to react to local overload when the telemetry processing load temporarily exceeds capacity. Over time, such excess load will be moved away by Computation Optimizer 312 using the periodic statistics data shared by several LPUs 120 via Control Plane management function 316. In the short term, though, LPU 120 may address overload in at least one of two ways. In the case where occasional telemetry loss is acceptable, no action is required—the overload condition can be resolved by the Computation Optimizer 312. A possible implementation may include specific messaging between LPU 120 and NVTP logic 130 via Control Plane management function 316 to signal a desire to move some load off the given LPU 120. In the case where telemetry loss is undesirable, LPU 120 can reserve memory and set thresholds to hold telemetry, thereby trading off memory (when available) for time.

Thus, those skilled in the art will appreciate that the embodiments described herein provide several benefits. In one implementation, IP anycast is used to deliver telemetry to available (and changing) LPUs 120. Local overloads can be managed, to some degree, locally, and then overtime, by redistribution of incoming data by Computation Optimizer 312.

To minimize the load on LPUs and optimize their performance, computational-graph based analytics and communication/synchronization mechanisms are employed for data-driven computation.

In an embodiment, automated closed-loop telemetry subscription management is employed. NVTP logic 130, and particularly Computation Optimizer 312, manages anycast addresses and telemetry subscriptions in a way to use transiently-available resources of LPUs 120 in a practical way.

For a given spike in received telemetry, LPUs 120 are configured to react by utilizing memory capacity as appropriate. Over time, the resources of LPUs 120 are optimized via Computation Optimizer 312 by moving telemetry streams to improve load distribution (and optionally other goals, such as execution latency, execution jitter, propensity for distribution, etc.).

Figure 4:
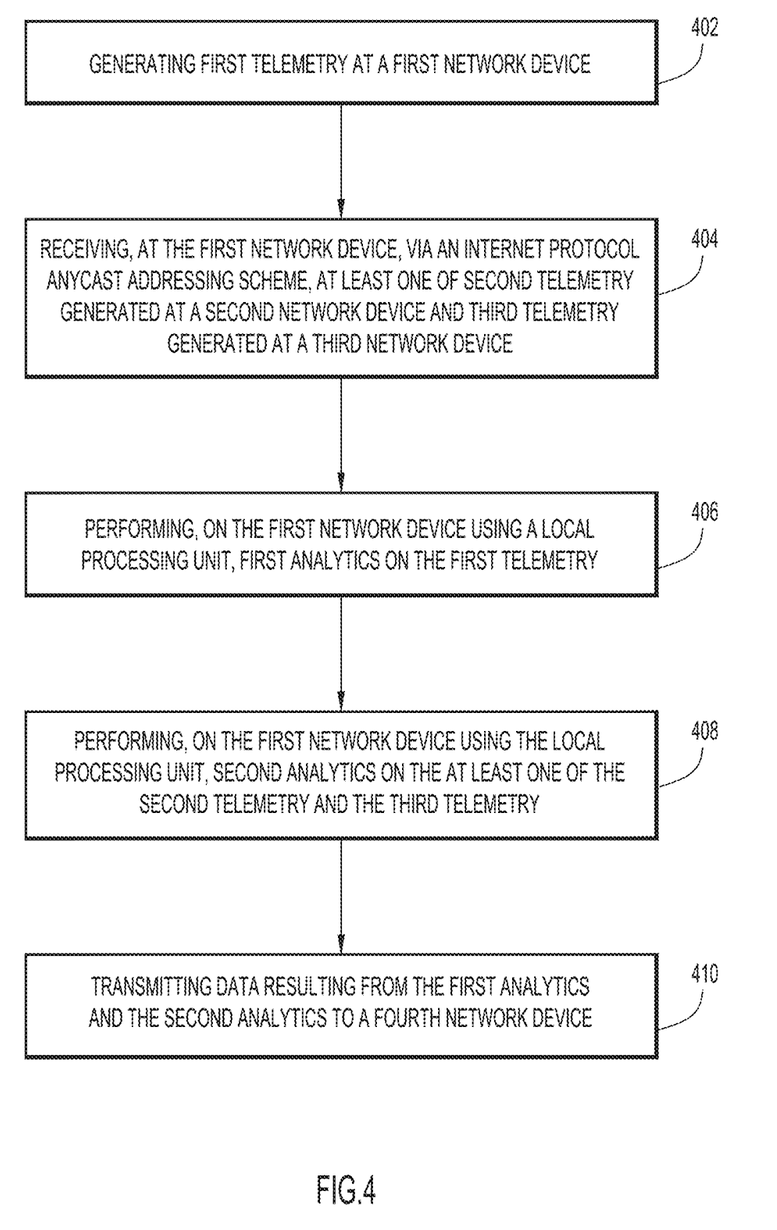
FIG. 4 is a flowchart depicting a series of operations executed by LPU logic, in accordance with an example embodiment.

FIG. 4 is a flowchart depicting a series of operations executed by LPU 120 and/or LPU logic 122, in accordance with an example embodiment. At 402, an operation includes generating first telemetry at a first network device. At 404, an operation includes receiving, at the first network device, via an Internet Protocol anycast addressing scheme, at least one of second telemetry generated at a second network device and third telemetry generated at a third network device. At 406, an operation includes performing, on the first network device using a local processing unit, first analytics on the first telemetry. At 408, an operation includes performing, on the first network device using the local processing unit, second analytics on the at least one of the second telemetry and the third telemetry. And, at 410, an operation includes transmitting data resulting from the first analytics and the second analytics to a fourth network device (e.g., controller 150 and/or Analytics System 140.

Figure 5:
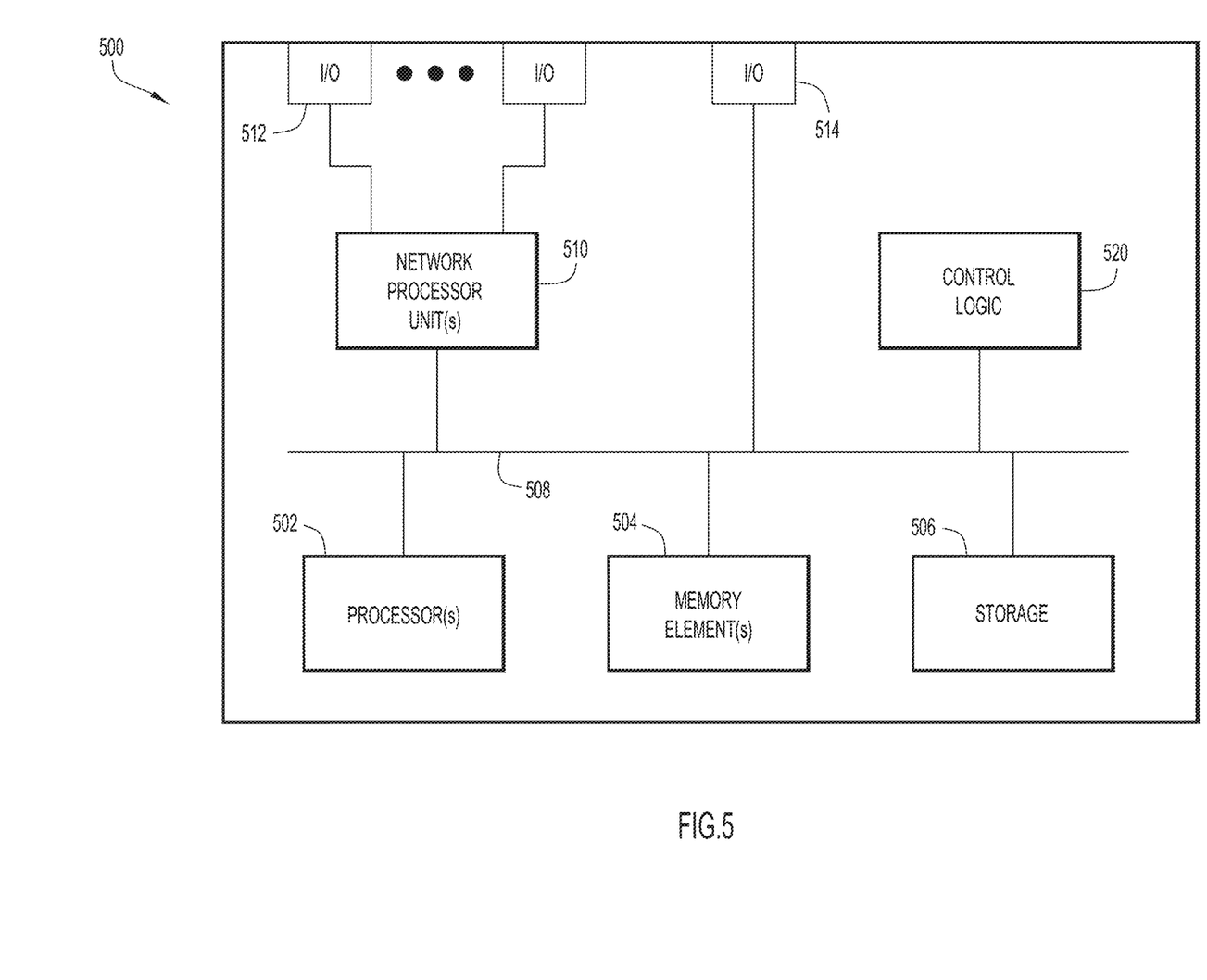
FIG. 5 illustrates a system that may be configured to host network virtual telemetry processing logic, in accordance with an example embodiment.

FIG. 5 illustrates a hardware block diagram of a computing device 500 that may perform functions associated with operations discussed herein in connection with the techniques depicted in FIGS. 1-4. In various embodiments, a computing device, such as computing device 500 or any combination of computing devices 500, may be configured as any entity/entities as discussed for the techniques depicted in connection with FIGS. 1-4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

In sum, a method may be provided. The method may include generating first telemetry at a first network device, receiving, at the first network device, via an Internet Protocol anycast addressing scheme, at least one of second telemetry generated at a second network device, and third telemetry generated at a third network device, performing, on the first network device using a local processing unit, first analytics on the first telemetry, performing, on the first network device using the local processing unit, second analytics on the at least one of the second telemetry and the third telemetry, and transmitting data resulting from the first analytics and the second analytics to a fourth network device.

The method may further include receiving, at the first network device, a first segment of a computational graph to perform the first analytics.

The method may also include receiving, at the first network device, a second segment of the computational graph, different from the first segment of the computational graph, to perform the second analytics.

The method may still further include receiving, at the first network device, a third segment of the computational graph, different from the first segment of the computational graph and the second segment of the computational graph, to perform third analytics on the third telemetry.

The method may include caching the first segment of the computational graph on the first network device after the first analytics have been completed.

The method may also include applying cache invalidation criteria to the first segment of the computational graph to confirm a validity of the first segment of the computational graph.

The method may include sending, by the first network device, data representative of compute resources availability on the first network device to a computational optimizer that is configured to determine whether the second telemetry and the third telemetry is to be routed to the first network device.

The method may also include, at the first network device, temporarily storing the first telemetry while processing non-telemetry data, and then, thereafter, performing the first analytics on the first telemetry.

The method may include, at the first network device, merging results of the first analytics and the second analytics.

The method may include transmitting data resulting from the first analytics and the second analytics to a fourth network device comprises transmitting a set of merged results based on the first analytics and the second analytics.

An apparatus may also be provided. The apparatus may include a network interface unit configured to enable network communications, a memory configured to store logic instructions, and a processor, when executing the logic instructions, configured to: generate first telemetry, receive via an Internet Protocol anycast addressing scheme, at least one of second telemetry generated at a first network device, and third telemetry generated at a second network device, perform, using a local processing unit on the apparatus, first analytics on the first telemetry, perform, using the local processing unit on the apparatus, second analytics on the at least one of the second telemetry and the third telemetry, and transmit data resulting from the first analytics and the second analytics to a third network device.

The apparatus may be configured to receive a first segment of a computational graph to perform the first analytics.

The apparatus may be configured to receive a second segment of the computational graph, different from the first segment of the computational graph, to perform the second analytics.

The apparatus may be configured to receive a third segment of the computational graph, different from the first segment of the computational graph and the second segment of the computational graph, to perform third analytics on the third telemetry.

The apparatus may be configured to cache the first segment of the computational graph after the first analytics have been completed.

The apparatus may be configured to apply cache invalidation criteria to the first segment of the computational graph to confirm a validity of the first segment of the computational graph.

The apparatus may be configured to send data representative of compute resources availability to a computational optimizer that is configured to determine which of the second telemetry and the third telemetry is to be routed to the apparatus.

In still another form, a non-transitory computer readable storage media is provided. The non-transitory computer readable storage media may be encoded with instructions that, when executed by a processor, cause the processor to: generate first telemetry at first network device, receive, at the first network device, via an Internet Protocol anycast addressing scheme, at least one of second telemetry generated at a second network device, and third telemetry generated at a third network device, perform, using a local processing unit at the first network device, first analytics on the first telemetry, perform, using the local processing unit at the first network device, second analytics on the at least one of the second telemetry and the third telemetry, and transmit data resulting from the first analytics and the second analytics to a fourth network device.

The instructions, when executed by the processor, may cause the processor to receive, at the first network device, a first segment of a computational graph to perform the first analytics.

The instructions, when executed by the processor, may cause the processor to receive, at the first network device, a second segment of the computational graph, different from the first segment of the computational graph, to perform the second analytics.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   generating first telemetry at a first network device;
   receiving, at the first network device, via an Internet Protocol anycast addressing scheme that is configured, by control logic, based on transiently-available resources of the first network device, at least one of second telemetry generated at a second network device, and third telemetry generated at a third network device;
   in response to receiving the at least one of the second telemetry and the third telemetry, retrieving by the first network device at least a portion of a computational graph that defines analytics to be performed on the at least one of the second telemetry and the third telemetry;
   performing, on the first network device using a local processing unit, first analytics on the first telemetry;
   performing, on the first network device using the local processing unit, second analytics based on the at least a portion of the computational graph on the at least one of the second telemetry and the third telemetry;
   transmitting data resulting from the first analytics and the second analytics to a fourth network device, wherein the control logic is hosted on the fourth network device; and
   in response to the first network device no longer being able to perform the second analytics on the at least one of the second telemetry and the third telemetry, controlling the Internet Protocol anycast addressing scheme such that the at least one of the second telemetry and the third telemetry is routed, respectively from the second network device and the third network device, to the fourth network device.

2. The method of claim 1, further comprising receiving, at the first network device, a first segment of a computational graph to perform the first analytics.

3. The method of claim 2, further comprising receiving, at the first network device, a second segment of the computational graph, different from the first segment of the computational graph, to perform the second analytics.

4. The method of claim 3, further comprising receiving, at the first network device, a third segment of the computational graph, different from the first segment of the computational graph and the second segment of the computational graph, to perform third analytics on the third telemetry.

5. The method of claim 2, further comprising caching the first segment of the computational graph on the first network device after the first analytics have been completed.

6. The method of claim 5, further comprising applying cache invalidation criteria to the first segment of the computational graph to confirm a validity of the first segment of the computational graph.

7. The method of claim 1, further comprising sending, by the first network device, data representative of compute resources availability on the first network device to the fourth network device.

8. The method of claim 1, further comprising, at the first network device, temporarily storing the first telemetry while processing non-telemetry data, and then, thereafter, performing the first analytics on the first telemetry.

9. The method of claim 1, further comprising, at the first network device, merging results of the first analytics and the second analytics.

10. The method of claim 9, wherein transmitting data resulting from the first analytics and the second analytics to a fourth network device comprises transmitting a set of merged results based on the first analytics and the second analytics.

11. An apparatus comprising:
a network interface unit configured to enable network communications;
a memory configured to store logic instructions; and
a processor, when executing the logic instructions, configured to:
generate first telemetry;
receive via an Internet Protocol anycast addressing scheme that is configured, by control logic, based on transiently-available resources of the memory and the processor, at least one of second telemetry generated at a first network device, and third telemetry generated at a second network device;
in response to receiving the at least one of the second telemetry and the third telemetry, retrieve at least a portion of a computational graph that defines analytics to be performed on the at least one of the second telemetry and the third telemetry;
perform, using a local processing unit on the apparatus, first analytics on the first telemetry;
perform, using the local processing unit on the apparatus, second analytics based on the at least a portion of the computational graph on the at least one of the second telemetry and the third telemetry;
transmit data resulting from the first analytics and the second analytics to a third network device, wherein the control logic is hosted by the third network device; and
in response to the apparatus no longer being able to perform the second analytics on the at least one of the second telemetry and the third telemetry, the control logic controlling the Internet Protocol anycast addressing scheme such that the at least one of the second telemetry and the third telemetry is routed, respectively from the first network device and the second network device, to the third network device.

12. The apparatus of claim 11, wherein the processor is further configured to receive a first segment of a computational graph to perform the first analytics.

13. The apparatus of claim 12, wherein the processor is further configured to receive a second segment of the computational graph, different from the first segment of the computational graph, to perform the second analytics.

14. The apparatus of claim 13, wherein the processor is further configured to receive a third segment of the computational graph, different from the first segment of the computational graph and the second segment of the computational graph, to perform third analytics on the third telemetry.

15. The apparatus of claim 12, wherein the processor is further configured to cache the first segment of the computational graph after the first analytics have been completed.

16. The apparatus of claim 15, wherein the processor is further configured to apply cache invalidation criteria to the first segment of the computational graph to confirm a validity of the first segment of the computational graph.

17. The apparatus of claim 11, wherein the processor is further configured to send data representative of compute resources availability to a computational optimizer, hosted by the third network device, that is configured to determine which of the second telemetry and the third telemetry is to be routed to the apparatus.

18. A non-transitory computer readable storage media encoded with instructions that, when executed by a processor, cause the processor to:
generate first telemetry at a first network device;
receive, at the first network device, via an Internet Protocol anycast addressing scheme that is configured, by control logic, based on transiently-available resources of the processor, at least one of second telemetry generated at a second network device, and third telemetry generated at a third network device;
in response to receiving the at least one of the second telemetry and the third telemetry, retrieve by the first network device at least a portion of a computational graph that defines analytics to be performed on the at least one of the second telemetry and the third telemetry;
perform, using a local processing unit at the first network device, first analytics on the first telemetry;
perform, using the local processing unit at the first network device, second analytics on the at least one of the second telemetry and the third telemetry;
transmit data resulting from the first analytics and the second analytics to a fourth network device, wherein the control logic is hosted on the fourth network device; and
in response to the first network device no longer being able to perform the second analytics on the at least one of the second telemetry and the third telemetry, control the Internet Protocol anycast addressing scheme such that the at least one of the second telemetry and the third telemetry is routed, respectively from the second network device and the third network device, to the fourth network device.

19. The non-transitory computer readable storage media of claim 18, encoded with instructions that, when executed by the processor, cause the processor to receive, at the first network device, a first segment of a computational graph to perform the first analytics.

20. The non-transitory computer readable storage media of claim 19, encoded with instructions that, when executed by the processor, cause the processor to receive, at the first network device, a second segment of the computational graph, different from the first segment of the computational graph, to perform the second analytics.

* * * * *